(12) United States Patent
Weaver et al.

(10) Patent No.: US 11,660,818 B2
(45) Date of Patent: May 30, 2023

(54) HIGH-THROUGHPUT TESTING SYSTEM AND METHOD FOR ADDITIVE MANUFACTURING

(71) Applicant: General Electric Company, Schenectady, NY (US)

(72) Inventors: Scott Andrew Weaver, Ballston Lake, NY (US); Timothy Hanlon, Glenmont, NY (US); Vipul Kumar Gupta, Guilderland, NY (US); Anthony J Vinciquerra, III, Rexford, NY (US)

(73) Assignee: General Electric Company, Schenectady, NY (US)

( * ) Notice: Subject to any disclaimer, the term of this patent is extended or adjusted under 35 U.S.C. 154(b) by 892 days.

(21) Appl. No.: 16/438,742

(22) Filed: Jun. 12, 2019

(65) Prior Publication Data

US 2020/0391441 A1     Dec. 17, 2020

(51) Int. Cl.
*B29C 64/379*   (2017.01)
*G01N 3/08*     (2006.01)
*B33Y 80/00*    (2015.01)
*B33Y 50/00*    (2015.01)
*B33Y 10/00*    (2015.01)

(52) U.S. Cl.
CPC ............. *B29C 64/379* (2017.08); *G01N 3/08* (2013.01); *B33Y 10/00* (2014.12); *B33Y 50/00* (2014.12); *B33Y 80/00* (2014.12)

(58) Field of Classification Search
CPC .. G01N 3/10; G01N 3/32; G01N 3/08; G01N 3/18; B29C 64/386; B33Y 40/00; B33Y 50/00

USPC .......................................................... 73/819
See application file for complete search history.

(56) References Cited

U.S. PATENT DOCUMENTS

| | | | |
|---|---|---|---|
| 6,736,017 B2 * | 5/2004 | Mansky .................... | G01N 3/02 73/159 |
| 9,109,979 B2 | 8/2015 | Dietrich et al. | |
| 2007/0020662 A1 | 1/2007 | Cima et al. | |
| 2009/0326706 A1 * | 12/2009 | Fink ....................... | B29C 64/176 700/212 |
| 2011/0137578 A1 * | 6/2011 | Dietrich .................. | B29C 64/40 73/826 |
| 2017/0138906 A1 | 5/2017 | Hartwig et al. | |
| 2018/0188144 A1 * | 7/2018 | Deal ........................ | G01N 3/32 |

(Continued)

FOREIGN PATENT DOCUMENTS

WO     2012048982 A1     4/2012

OTHER PUBLICATIONS

Dongare, Sujitkumar et al., "A Mechanical Testing Methodology for Metal Additive Manufacturing Processes", 2014, (pp. 224-243, 20 total pages).

*Primary Examiner* — Nathaniel T Woodward
(74) *Attorney, Agent, or Firm* — Dority & Manning, P.A.

(57) ABSTRACT

A method of testing a multi-specimen additive manufacturing build plate includes acquiring and installing the multi-specimen build plate in a test system, aligning one or more force exertion tools with respective selected specimens, imparting a force on the selected specimen(s), collecting test data from each selected specimen, and analyzing the collected data to identify a potential correlation between material behavior for the selected specimen and its applied manufacturing build parameter(s). A system and a non-transitory medium are also disclosed.

17 Claims, 5 Drawing Sheets

(56) References Cited

U.S. PATENT DOCUMENTS

| | | |
|---|---|---|
| 2018/0299359 A1 | 10/2018 | Troitino Lopez et al. |
| 2018/0356322 A1 | 12/2018 | Slaughter et al. |

* cited by examiner

HIGH-THROUGHPUT TESTING SYSTEM AND METHOD FOR ADDITIVE MANUFACTURING

BACKGROUND

Additive manufacturing (AM) produces a component one layer of material at a time. More specifically, in powder-bed additive manufacturing, a layer of powder material is deposited onto a substrate, and melted through exposure to heat, a laser, an electron beam or some other process and subsequently solidified. Once solidified, a new layer is deposited, solidified, and fused to the previous layer until the component is formed.

Given the inherent variability in the AM process, it is important to test a large number of samples before AM parameters are locked for production runs on an AM machine. Mechanical testing in serial fashion requires human intervention, resources, time and cost, and significantly extends the overall additive parameter development process. For example, the conventional process of property evaluation vs. build parameter set involves several manual intervention steps, including removing each specimen from the build plate, operator installation of each specimen into a load frame, instrumenting each specimen with strain-gauge or extensometer, heating each specimen to the desired test temperature, testing, cooling each specimen to room temperature, and finally, removal of each specimen from the load frame so the process can be repeated for the next specimen.

To optimize materials development for AM specific applications, materials property screening during the AM process and parameter optimization is required. Conventional mechanical testing for this type of processed material usually take several weeks to months, and sometimes years. This conventional approach to AM process and parameter optimization results in significant monetary, infrastructure, and personnel expenditures. Traditional processing methods (e.g., casting and deformation processing) are more established with fewer variables, and the effects of such variables on material properties are relatively more predictable. AM process variables, on the other hand, are highly linked to material performance, with less-developed or unknown transfer functions in many cases. Therefore, it is imperative that design, process and parameter optimization, and material optimization (chemistry/post-processing treatments) are enabled in parallel for faster industrialization of additive manufacturing and accelerated insertion of new additive materials.

DESCRIPTION

Embodying systems and methods mechanically test multiple specimens (interchangeably herein "specimen" or "coupon") built on a single additive manufacturing build plate. An embodying high-throughput mechanical test system includes a mounting table to which the multi-specimen AM build plate is mounted. In accordance with embodiments, one or more of the specimens on the build plate can be tested. The system can be adapted to test specimens in uniaxial or multiaxial tension, compression, bending, and/or fatigue (cycling).

Embodying methods provide a build plate with multiple test coupons produced by an AM process. The build plate is installed on the mounting table and one or more of the coupons can be engaged by a force exertion tool. After testing, the mounting table can move the build plate so that the force exertion tool can engage another coupon. In some implementations, the mounting plate can remain stationary and the tool repositioned across the build plate. Measurement instrumentation can record data for each tested specimen (for example, load, displacement, strain, temperature, time, and fatigue cycle count).

Embodying systems implement the testing methods to test large coupon sampling sizes autonomously with minimal operator interaction. An embodying high-throughput test system can test one or more designated specimens, acquire test data through measurement instrumentation, and align a force exertion tool with the next specimen to undergo testing. Acquired measurement data can be analyzed automatically.

Compared with conventional approaches, operator interaction is reduced by a large portion because the need to remove the tested specimen and mount the next specimen (as performed under conventional approaches) is eliminated by embodiments.

Embodying systems and methods result in cost and time reductions over conventional test approaches. System autonomy and analytic autonomy operates without dedicating an operator to install test specimens after each individual test, or to analyze the data produced by each individual test.

In accordance with embodiments, operator/user input can select an individual test specimen, specimen grouping(s), or all specimens on the plate. This selective testing can identify testing samples located, for example, in the middle of the build plate.

Figure 1:
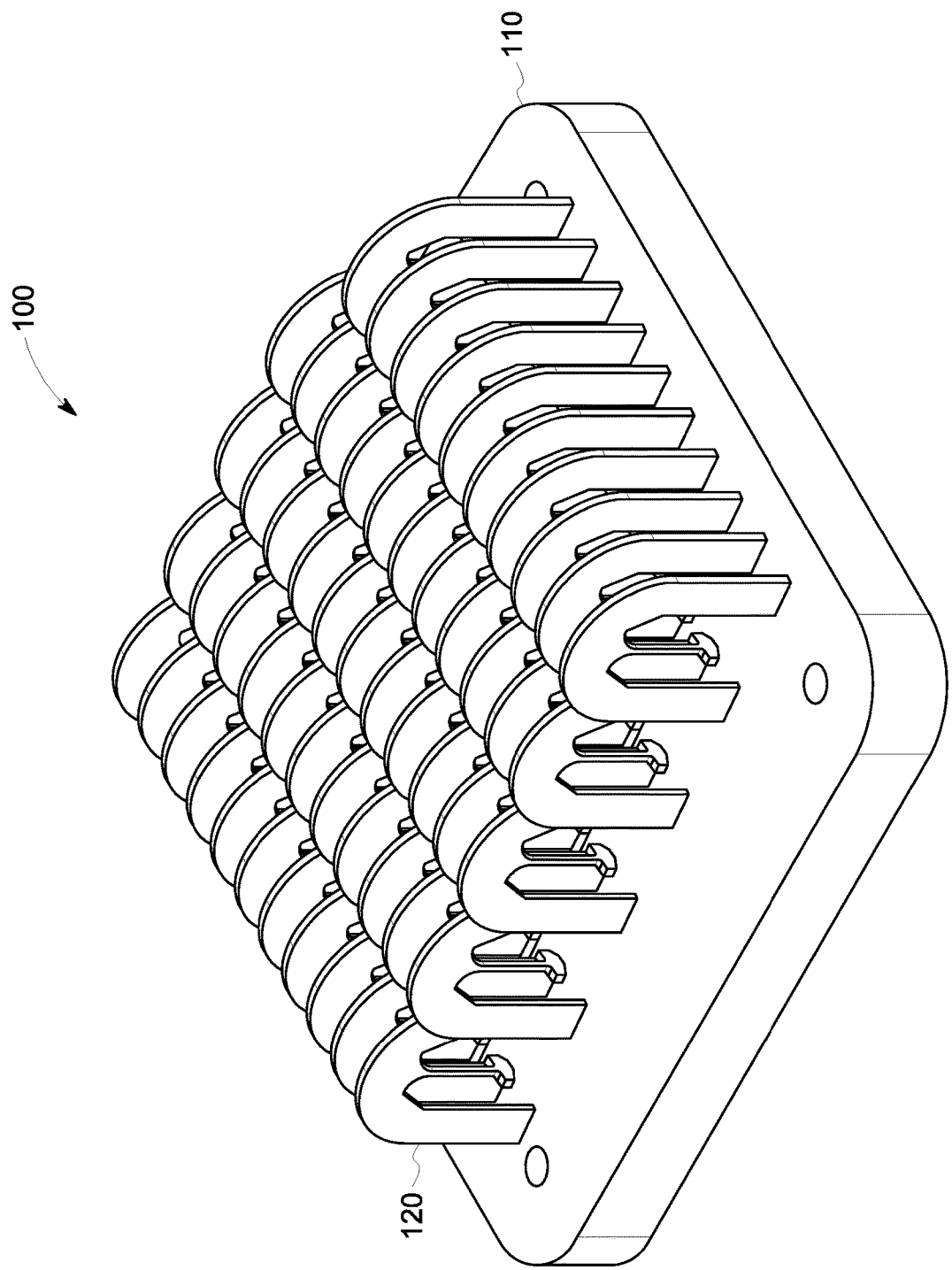
FIG. 1 is a perspective depiction of a multi-specimen additive manufacturing build plate in accordance with embodiments.

FIG. 1 is a perspective depiction of multi-specimen build plate 100 in accordance with embodiments. Build plate 100 can include multiple specimen samples 120. It should be readily understood that embodying systems and methods are not limited by the quantity or shape of samples 120 on the build plate.

Figure 2:
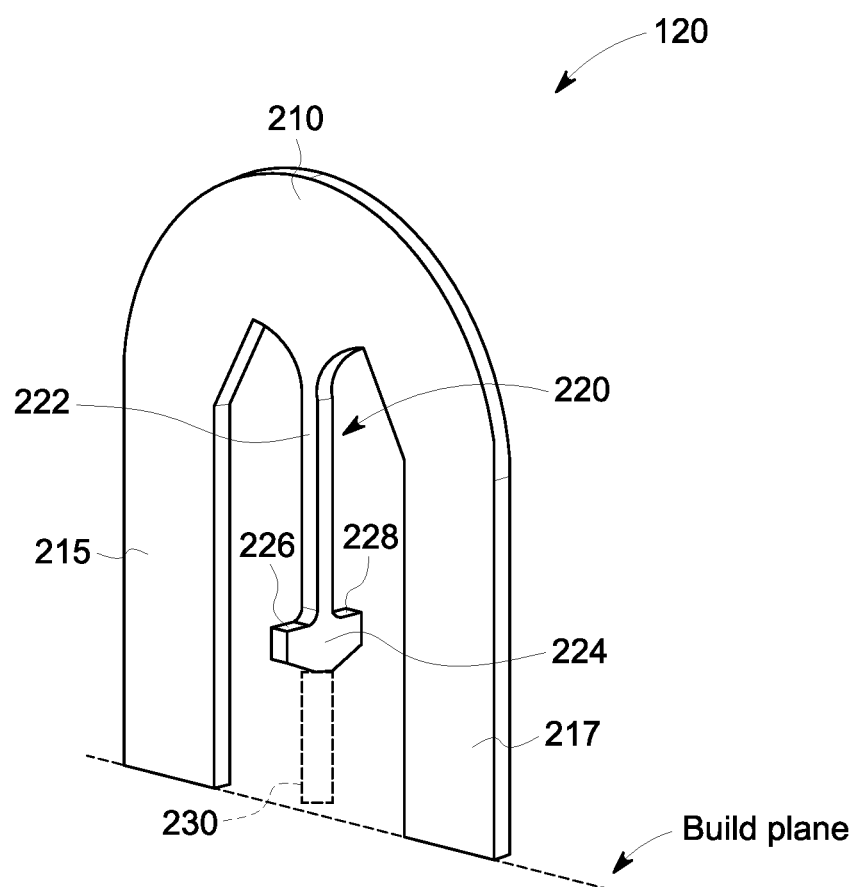
FIG. 2 is a perspective depiction of a test specimen in accordance with embodiments.

FIG. 2 is a perspective depiction of specimen 120 in accordance with embodiments. This depiction is of one, non-limiting embodiment for specimen 120. It should be readily understood that the specimen can be of varying shapes and configurations. For purposes of discussion, the embodiment depicted in FIG. 2 is detailed.

The specimen includes element-under-test 220 extending from supporting member 210. Specimen 120 includes leg 215, 217 attached to opposite ends of the supporting member.

Paddle 224 is located at a distal end of the element-under-test from the supporting member. In some embodiments paddle 224 can extend in a plane orthogonal to the plane of the tensile member. Paddle 224 includes loading surfaces 226, 228.

An AM process builds the multiple specimens on additive build plate 110. During the build, sacrificial member 230 is produced as support for the element-under-test. The sacrificial member can be produced by variations in the laser power, scan speed, beam spot-size, hatch spacing and/or other AM build parameters known to produce an inferior quality part. Proper selection of the sacrificial member's geometry and its build parameters can result in the sacrificial element self-destruction, so that its presence does not affect the specimen property testing. Embodying specimens are designed to test tensile properties of the AM product by imparting a downward load to surfaces 226 and 228, thereby generating a tensile load within element-under-test 220. Loading may continue until element-under-test 220 has physically separated into two pieces, or may discontinue prior to failure.

Figure 3:
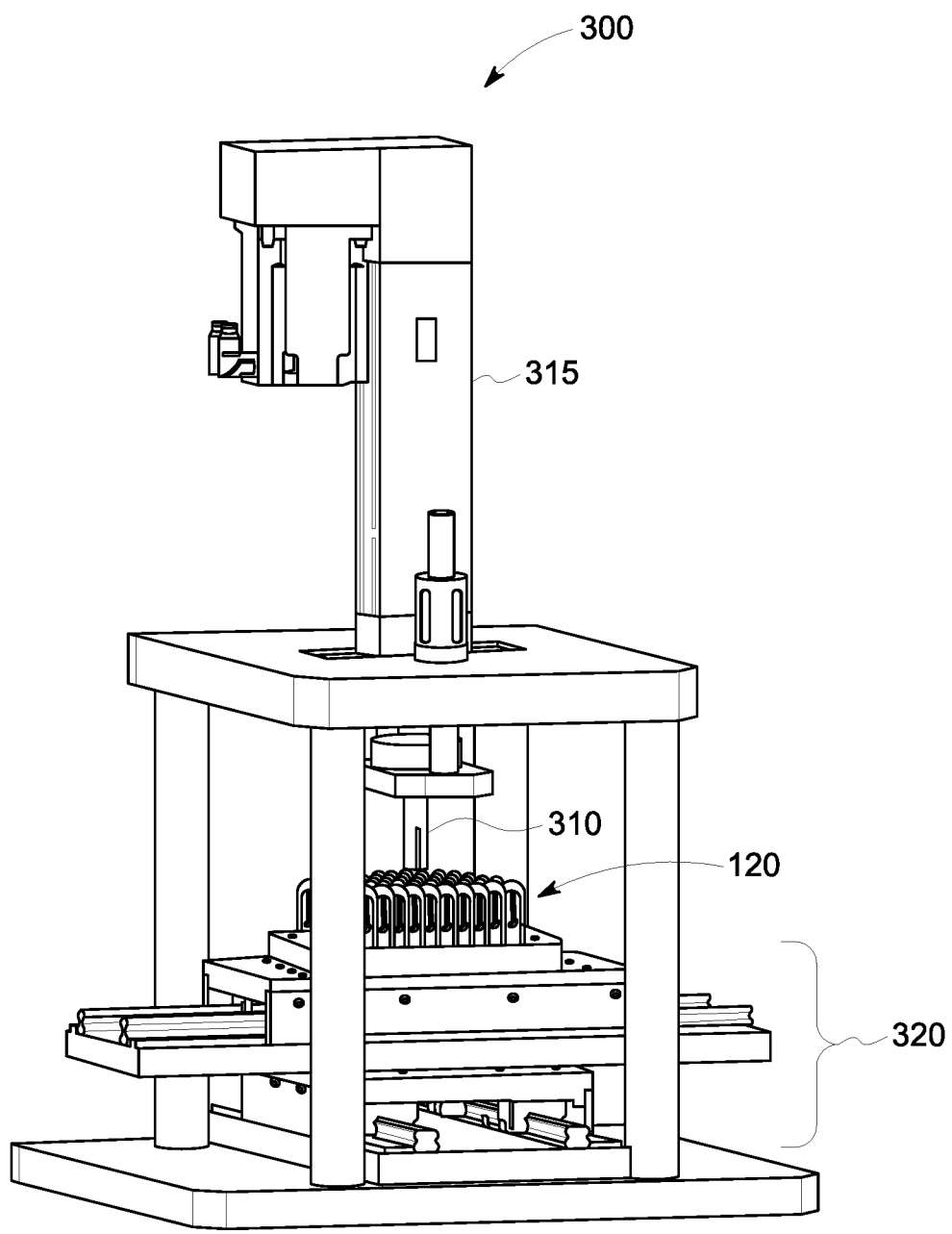
FIG. 3 is a perspective depiction of a high-throughput test system in accordance with embodiments.

FIG. 3 is a perspective depiction of high-throughput test system 300 in accordance with embodiments. The test system includes force exertion tool 310. In some embodiments, more than one force exertion tool (decoupled and isolated from each other) can be present to increase the test throughput rate. The force exertion tool can include a bifurcated feature (e.g., notched, split, channeled, etc.) to contact loading surfaces 226, 228. This bifurcated feature permits force to be exerted on paddle 224 without contacting the straight-section gage portion 222 of element-under-test 220.

In accordance with the depicted embodiment, mounting plate 320 can secure the multi-specimen build plate in the test system. For example, the build plate can be bolted, clamped, magnetically coupled, etc. to the mounting plate. The mounting plate can translate position in an xy plane perpendicular to the force exertion tool longitudinal axis. In other implementations, the mounting plate can include other degrees of freedom. In other embodiments, the mounting plate can be stationary and the force exertion tool can translate position.

Tool drive unit 315 contains drive components to move the force exertion tool. The drive components can operate by electric, hydraulic, or pneumatic power. In accordance with embodiments, the tool drive unit can move the force exertion tool in manners to create push, pull, bend, and/or twisting forces on the element undergoing test.

Instrumentation unit 330 includes metrology device(s) that can measure loads, displacements, temperature, and/or strains on the specimen. Embodying metrology devices can include a force transducer, for example, a load cell, or any suitable force measurement device. Included in the instrumentation unit can be a device to measure displacement of the element along, for example, its longitudinal axis. In some implementations the displacement can be measured by a linear variable transducer. The applied load and resulting specimen displacement parameters can be extracted from the acquired measurement data. Other parameters that can be extracted include, but not limited to, time duration, temperature, and strain information In accordance with embodiments, the orientation of the specimen samples 120 can be built inverted from as depicted in FIGS. 1-2. In this implementation, element-under-test 220 is built up with the paddle 224 suspended by gage portion 222, without the need for sacrificial member 230. In accordance with embodiments, a force exertion tool can be used to exert force on a specimen, or forces generated by the specimen's own weight can be quantified to determine AM build material property characteristics.

Figure 4:
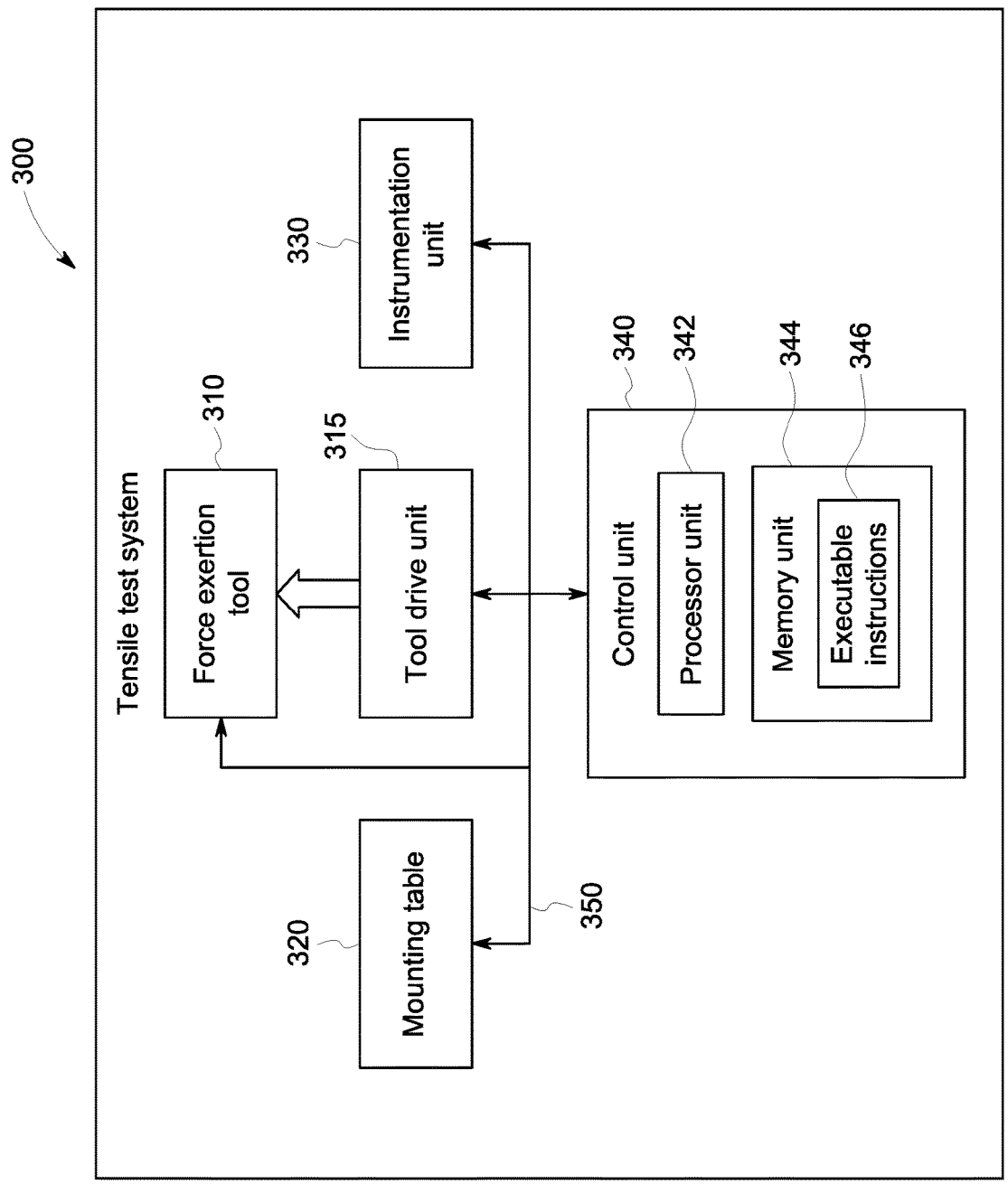
FIG. 4 is a schematic depiction of the high-throughput test system of FIG. 3 in accordance with embodiments.

FIG. 4 is a schematic depiction of high-throughput test system 300 in accordance with embodiments. Control unit 340 can include processor unit 342 and memory unit 344. The control processor can be in communication with components of test system 300 across control/data bus 350. Processor unit 342 can execute executable instructions 346, which cause the processor to perform embodying testing methods as disclosed herein. Memory unit 344 can provide the control processor with local cache memory for operations and data storage.

In accordance with embodiments, during production of the multi-specimen build plate the AM build parameters can be varied on a specimen-by-specimen basis. For example, in laser-based AM machines, the build parameters that can be varied include, but are not limited to, powder layer thickness, laser power, laser scan-speed, laser beam spot-size, hatch spacing, etc. In this manner, multiple build parameter combinations can be tested from the same multi-specimen build plate. This information then can be used to generate a transfer function, machine learning model, and/or response surfaces between build parameters and measured mechanical properties.

It should be readily understood that disclosed embodiments are not limited to a particular additive manufacturing modality. For example, an embodying multi-specimen build plate can be produced by any additive manufacturing method, such as, but not limited to direct metal laser melting (DMLM), binder-jet, electron-beam melting, directed-energy deposition, etc. Further, a multi-specimen build could be fabricated from metallic and/or non-metallic materials, composites, ceramics and polymers, or combination of multi-materials. AM build parameters can not only be varied on a specimen-by-specimen basis, but also be varied within the element under test—i.e., creating a graded material property element.

Other testing regimes can also be implemented by embodying systems and methods. For example, defect analysis and property prediction techniques can benefit from analyzing test results for specimens having 'seeded' defects—i.e., defects intentionally created for evaluation purposes. The seeded defects can include combinations of AM build parameter variations to cause, for example, porosity differences, poor fusion between layers and/or hatches, structural abnormalities (creation of cracks, notches, necks, etc.). The AM build parameters can be adjusted to create these defects. The test results for individual specimens can be correlated to the intentional variations in build parameters to understand the correlation between AM parameter variation and its manifestation in the production piece.

Figure 5:
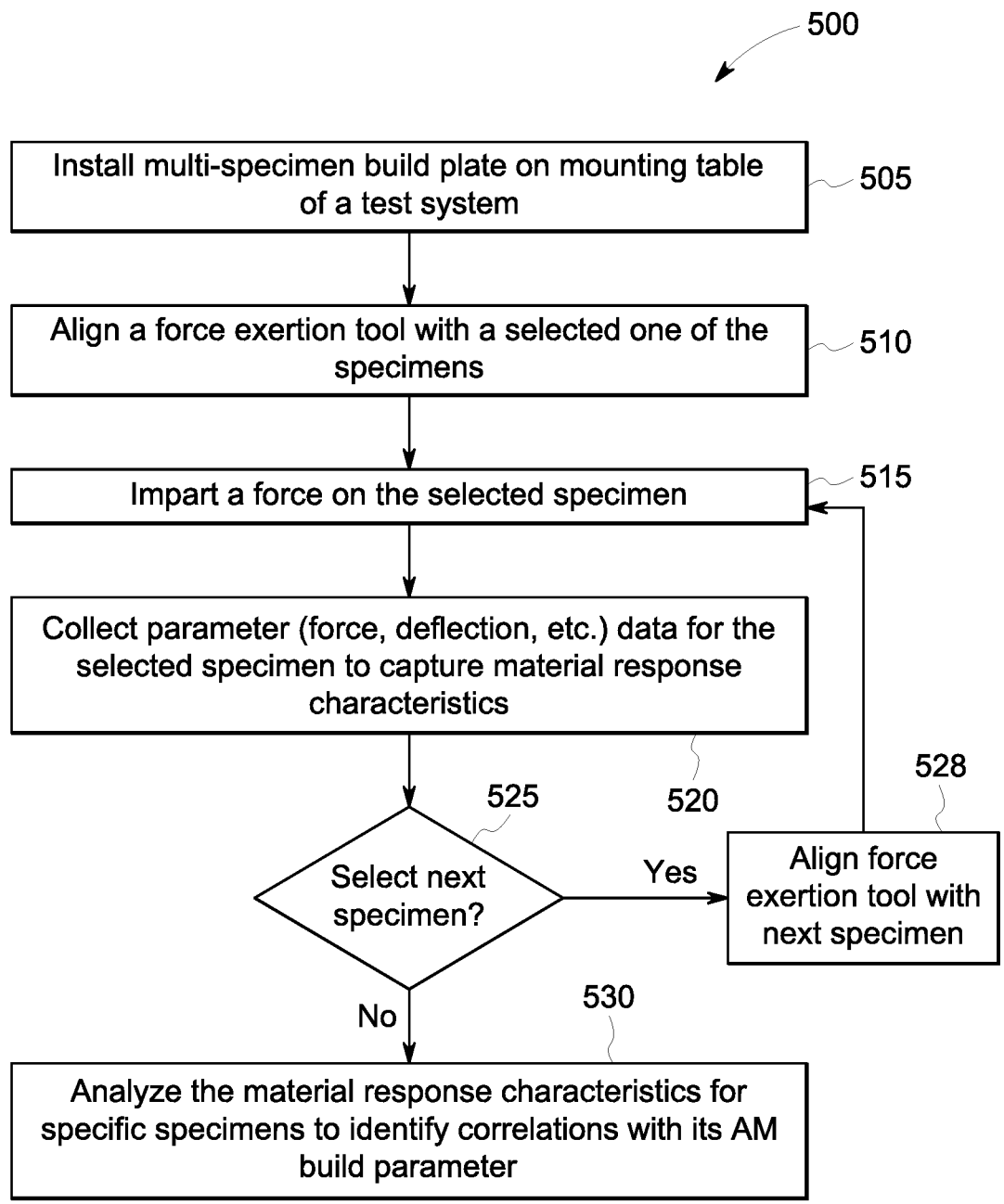
FIG. 5 is a flow diagram for a high-throughput specimen test process in accordance with embodiments.

FIG. 5 depicts a flow diagram for process 500 to perform high-throughput specimen testing in accordance with embodiments. A multi-specimen build plate is mounted, step 505, on a mounting table of a test system. The multi-specimen build plate includes specimens, which in some embodiments can have different AM build parameters between specimens (individually or in groupings).

A force exertion tool is aligned, step 510, with a selected one of the specimens. The force exertion tool contacts the selected specimen on a loading surface of the specimen. The force exertion tool imparts, step 515, a force on an element-under-test of the specimen. Parameters (e.g., force, deflection, etc.) for the specimen are monitored, step 520, to capture the specimen's material response characteristics.

If another specimen is to be selected, step 525, the force exertion tool is aligned with the next specimen, step 528. If specimen testing is completed, step 525, the data is analyzed, step 530. The analysis is to identify correlations between specific AM build parameter material response characteristic(s) for a specimen and its associated data. In accordance with implementations, analysis of a particular specimen need not be performed when testing of all specimens of the multi-specimen build plate is completed—for example, analysis can be done after each specimen, or after testing of one or more subsets of specimens on the multi-specimen build plate are completed.

Embodying high-throughput test systems and methods contribute to an accelerated additive parameter development and optimization process. This acceleration in development can significantly reduce development time and cost by reducing and/or eliminating traditional testing methods. By providing rapid property screening processes during parameter development, production level builds can begin sooner than when compared to conventional, labor-intensive, single specimen testing techniques.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as an autonomous method of applying a force to determine the mechanical properties of specimens on a multi-specimen build plate with minimal operator interaction, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system for testing a multi-specimen additive manufacturing build plate, the system comprising:
   a mounting plate configured to secure the multi-specimen additive manufacturing build plate in the system;
   a force exertion tool having a longitudinal axis and a bifurcated feature configured to exert a force on a loading surface of a selected specimen of the multi-specimen additive manufacturing build plate, and wherein at least one of the mounting plate or the force exertion tool is translatable in a plane perpendicular to the longitudinal axis;
   a tool drive unit including drive components operable to cause the force exertion tool to exert the force;
   an instrumentation unit including metrology devices configured to acquire data on one or more conditions of the selected specimen during the force exertion; and
   a processor unit configured to access executable instructions that cause the processor unit to extract parameters from the acquired data including one or more of applied load, deflection, time, temperature, and strain information.

2. The system of claim 1, wherein the bifurcated feature is configured to contact the loading surface of the selected specimen and to exert force on the loading surface without contacting a gage portion of the selected specimen.

3. The system of claim 1, including more than one force exertion tool, each of the more than one force exertion tool decoupled from others of the more than one force exertion tool.

4. The system of claim 1, including the mounting plate configured to translate its position in the plane in relation to a position of the force exertion tool to align a next specimen with the force exertion tool.

5. The system of claim 1, including the force exertion tool configured to translate its position in the plane in relation to a position of the mounting plate to align a next specimen with the force exertion tool.

6. A method of testing a multi-specimen additive manufacturing build plate, the method comprising:
   acquiring the multi-specimen additive manufacturing build plate, the multi-specimen additive manufacturing build plate having a plurality of specimens;
   installing the multi-specimen additive manufacturing build plate onto a mounting plate in a test system;
   aligning a force exertion tool having a longitudinal axis and a bifurcated feature with a selected one of the plurality of specimens by translating at least one of the mounting plate or the force exertion tool in a plane perpendicular to the longitudinal axis;
   imparting a force on the selected one of the plurality of specimens;
   collecting test data from the selected one of the plurality of specimens;
   determining if another specimen of the plurality of specimens is to be selected; and
   analyzing the collected test data for the selected one of the plurality of specimens to identify a correlation between the collected test data for the selected one of the plurality of specimens and its applied manufacturing build parameter(s).

7. The method of claim 6, including providing the multi-specimen additive manufacturing build plate, each of the plurality of specimens having a supporting member, at least one leg between the supporting member and the multi-specimen additive manufacturing build plate, and an element-under-test connected to the supporting member, wherein the supporting member, the at least one leg, and the element-under-test are an integral assembly.

8. The method of claim 7, including varying the applied manufacturing build parameter(s) among the plurality of specimens.

9. The method of claim 7, including varying one or more of the applied manufacturing build parameter(s) within at least one of the plurality of specimens.

10. The method of claim 6, the collecting test data including obtaining at least one of force, time, temperature, strain, or displacement data resulting from imparting the applied force on the selected one of the plurality of specimens.

11. The method of claim 6, including:
    about simultaneously aligning more than one force exertion tool with respective selected specimens of the plurality of specimens; and
    imparting a force on the respective selected specimens.

12. A non-transitory computer-readable medium having stored thereon executable instructions when executed by a processor unit cause the processor unit to perform a method of testing a multi-specimen additive manufacturing build plate, the method comprising:

acquiring the multi-specimen additive manufacturing build plate, the multi-specimen additive manufacturing build plate having a plurality of specimens;

installing the multi-specimen additive manufacturing build plate onto a mounting plate in a test system;

aligning a force exertion tool having a longitudinal axis and a bifurcated feature with a selected one of the plurality of specimens by translating at least one of the mounting plate or the force exertion tool in a plane perpendicular to the longitudinal axis;

imparting a force on the selected one of the plurality of specimens;

collecting test data from the selected one of the plurality of specimens;

determining if another specimen of the plurality of specimens is to be selected; and analyzing the collected test data for selected one of the plurality of specimens to identify a correlation between the collected test data for the selected one of the plurality of specimens and its applied manufacturing build parameter(s).

13. The non-transitory computer-readable medium of claim 12, the executable instructions further configured to cause the processor unit to perform the method, including providing the multi-specimen additive manufacturing build plate, each of the plurality of specimens having a supporting member, at least one leg between the supporting member and the multi-specimen additive manufacturing build plate, and an element-under-test connected to the supporting member, wherein the supporting member, the at least one leg, and the element-under-test are an integral assembly.

14. The non-transitory computer-readable medium of claim 13, the executable instructions further configured to cause the processor unit to perform the method, including varying the applied manufacturing build parameter(s) among the plurality of specimens.

15. The non-transitory computer-readable medium of claim 13, the executable instructions further configured to cause the processor unit to perform the method, including varying one or more of the applied manufacturing build parameter(s) within at least one of the plurality of specimens.

16. The non-transitory computer-readable medium of claim 12, the executable instructions further configured to cause the processor unit to perform the method, the collecting test data including obtaining at least one of force, time, temperature, strain or displacement data resulting from imparting the applied force on the selected one of the plurality of specimens.

17. The non-transitory computer-readable medium of claim 12, the executable instructions further configured to cause the processor unit to perform the method, including:

about simultaneously aligning more than one force exertion tool with respective selected specimens of the plurality of specimens; and imparting a force on the respective selected specimens.

* * * * *